(12) United States Patent
Dekel et al.

(10) Patent No.: US 11,465,334 B2
(45) Date of Patent: Oct. 11, 2022

(54) STRUCTURE SUPPORTING AN OBJECT DURING ADDITIVE MANUFACTURING AND METHOD FOR FORMING

(71) Applicant: Stratasys Ltd., Rehovot (IL)

(72) Inventors: Karin Dekel, Kfar Shmuel (IL); Blake Zachary Courter, Reading, MA (US)

(73) Assignee: Stratasys Ltd., Rehovot (IL)

( * ) Notice: Subject to any disclaimer, the term of this patent is extended or adjusted under 35 U.S.C. 154(b) by 0 days.

(21) Appl. No.: 17/255,525

(22) PCT Filed: Jun. 25, 2019

(86) PCT No.: PCT/IL2019/050708
§ 371 (c)(1),
(2) Date: Dec. 23, 2020

(87) PCT Pub. No.: WO2020/003312
PCT Pub. Date: Jan. 2, 2020

(65) Prior Publication Data
US 2021/0221045 A1     Jul. 22, 2021

Related U.S. Application Data

(60) Provisional application No. 62/691,030, filed on Jun. 28, 2018.

(51) Int. Cl.
*B29C 64/209* (2017.01)
*B29C 64/106* (2017.01)
(Continued)

(52) U.S. Cl.
CPC .......... *B29C 64/106* (2017.08); *B29C 64/209* (2017.08); *B29C 64/40* (2017.08);
(Continued)

(58) Field of Classification Search
CPC .......... B29C 64/40; B33Y 30/00; B33Y 80/00
See application file for complete search history.

(56) References Cited

U.S. PATENT DOCUMENTS

| 5,216,616 A | 6/1993 | Masters |
| 5,595,703 A | 1/1997 | Swaelens et al. |

(Continued)

FOREIGN PATENT DOCUMENTS

| EP | 2910362 | 8/2015 |
| EP | 3122541 | 2/2017 |
| WO | WO 2020/003312 | 1/2020 |

OTHER PUBLICATIONS

International Preliminary Report on Patentability dated Jan. 7, 2021 From the International Bureau of WIPO Re. Application No. PCT/IL2019/050708. (8 Pages).

(Continued)

*Primary Examiner* — Timothy Kennedy
*Assistant Examiner* — Farah Taufiq

(57) ABSTRACT

A supporting structure built together with an object in an additive manufacturing (AM) process and configured to support an overhang of the object is described. The supporting structure includes a first array of pillars formed with a first material and reinforced with a second material. Each of the pillars in the first array includes a top. At least a portion of the tops in the first array adjoin and define a surface on which the overhang of the object may be supported. The first material is support material.

25 Claims, 15 Drawing Sheets

(51) Int. Cl.
    *B29C 64/40* (2017.01)
    *B33Y 10/00* (2015.01)
    *B33Y 30/00* (2015.01)
    *B33Y 80/00* (2015.01)

(52) U.S. Cl.
    CPC .............. *B33Y 10/00* (2014.12); *B33Y 30/00* (2014.12); *B33Y 80/00* (2014.12)

(56) References Cited

U.S. PATENT DOCUMENTS

| | | |
|---|---|---|
| 6,228,923 B1 | 5/2001 | Lombardi et al. |
| 6,569,373 B2 | 5/2003 | Napadensky |
| 7,183,335 B2 | 2/2007 | Napadensky |
| 7,255,825 B2 | 8/2007 | Nielsen et al. |
| 7,364,686 B2 | 4/2008 | Kritchman et al. |
| 7,479,510 B2 | 1/2009 | Napadensky et al. |
| 8,983,643 B2 | 3/2015 | Heide |
| 9,573,323 B2 | 2/2017 | Heide |
| 2010/0191360 A1 | 7/2010 | Napadensky et al. |
| 2017/0173886 A1 | 6/2017 | Menchik et al. |
| 2018/0162062 A1 | 6/2018 | Mark |

OTHER PUBLICATIONS

International Search Report and the Written Opinion dated Sep. 24, 2019 From the International Searching Authority Re. Application No. PCT/IL2019/050708. (12 Pages).

STRUCTURE SUPPORTING AN OBJECT DURING ADDITIVE MANUFACTURING AND METHOD FOR FORMING

RELATED APPLICATIONS

This application is a National Phase of PCT Patent Application No. PCT/IL2019/050708 having International filing date of Jun. 25, 2019, which claims the benefit of priority under 35 USC § 119(e) of U.S. Provisional Patent Application No. 62/691,030 filed on Jun. 28, 2018. The contents of the above applications are all incorporated by reference as if fully set forth herein in their entirety.

FIELD AND BACKGROUND OF THE INVENTION

The present invention, in some embodiments thereof, relates to supporting structures for supporting an object during additive manufacturing and, more particularly, but not exclusively, to a method for forming the supporting structure with an additive manufacturing printing system.

Additive manufacturing (AM) is a technology enabling fabrication of arbitrarily shaped objects directly from computer data via additive formation steps. The basic operation of any AM system consists of slicing a three-dimensional computer model into thin cross sections, translating the results into two-dimensional position data and feeding the data to control equipment of an additive manufacturing system to fabricate a three-dimensional object in a layer-wise manner according to the data.

Inkjet printing systems are one group of AM systems. In inkjet printing systems, the building material includes a model material (also referred to as "modeling material"), which is deposited to produce the desired object, as well as a support material (also referred to as "supporting material") which provides temporary support to specific regions of the object during building and assures adequate vertical placement of subsequent object layers. Supporting structure geometries may be defined by the host computer and built with the support material utilizing the same deposition techniques by which the modeling material is deposited. During the inkjet printing process, the object and the supporting structure may be simultaneously built by selectively depositing both model material and support material within a same layer. The supporting structure is configured to be removed after the object is completed.

In some known inkjet printing systems, the model material is a photopolymer material that is cured with ultraviolet (UV) light after it is jetted. The model material may be a photopolymer that has a composition which, after curing, gives a solid material with mechanical properties that permit the building and handling of the three-dimensional object being built. The solidified material may be rigid, or may have elastic properties. The support material is formulated to permit fast and easy cleaning of the object from its support. The support material may be a polymer, which is water-soluble and/or capable of swelling and/or breaking down upon exposure to a liquid solution, e.g. water, alkaline or acidic water solution and may include a reactive component and a photo-initiator. The photo-initiator may enable at least partial solidification of the support material by curing with the same UV light applied to the model material.

U.S. Pat. No. 5,216,616 entitled "System and method for computer automated manufacture with reduced object shape distortion," the contents of which are incorporated herein by reference, describes a system and method for producing a three-dimensional object with improved dimensional accuracy from coordinates generated on a computer machine. Control signals are generated for controlling a servo that controls a reaction or interaction of material at the coordinate points to form the object while a second servo serves to build up a three-dimensional support system in response to support control signals. Support control signals are generated at the same time the coordinate points of the design are generated, to specify strategic points of the object at which a support environment need be placed in order to ensure the dimensional accuracy of the object, avoiding warpage or other dimensional distortion. As a support environment, a series of webs or columns, or encapsulation may be provided for providing a support environment for the object.

U.S. Pat. No. 8,983,643 entitled "Method for generating and building support structures with deposition-based digital manufacturing systems," the contents of which are incorporated herein by reference, describes a method for generating data for a support structure to be built with a deposition-based digital manufacturing system. The method includes generating a convex hull polygon based on a boundary polygon of a layer of the support structure, offsetting the convex hull polygon inward, offsetting the boundary polygon outward, and generating an intersection boundary polygon based at least in part on the offset boundary polygon and the offset convex hull polygon.

U.S. Pat. No. 7,364,686 entitled "System and method for printing and supporting three dimensional objects" of the same Assignee, the contents of which are incorporated herein by reference, describes a method for building three-dimensional objects and at least part of a supporting structure comprising support material with pillars of model material within the support material. Another part of the supporting structure may comprise a container made of modeling material for retaining liquid or paste support.

SUMMARY OF THE INVENTION

According to an aspect of some embodiments of the present invention there is provided a method for reducing the volume of material used to support an object being fabricated by AM manufacturing. Reducing the volume of material needed for support may reduce material waste associated with printing as well cost of printing. Optionally, the reduced volume of material may also ease the process of removing the support material from the object at the end of fabrication. According to some example embodiments, the reduced volume is achieved with a defined supporting structure formed with the support material. According to some example embodiments, the supporting structure is formed with both support material and model material and is defined to include an array of spire shaped air pockets. According to some example embodiments, the supporting structure includes a contact pad formed from a continuous layer of support material at an interface of the supporting structure with a surface of the object supported by the supporting structure.

According to an aspect of some example embodiments, there is provided a supporting structure built together with an object in an additive manufacturing (AM) process and configured to support an overhang of the object, the supporting structure comprising: a first array of pillars formed with a first material and reinforced with a second material, wherein each of the pillars in the first array includes a top; wherein at least a portion of the tops in the first array adjoin and define a surface on which the overhang of the object may be supported and wherein the first material is support material.

Optionally, the supporting structure includes a contact pad formed with the first material and configured to interface with the overhang of the object, wherein the overhand is built over the portion of the tops in the first array that are configured to adjoin.

Optionally, the second material forms a pitched helix along a length of at least a portion of the pillars in the first array.

Optionally, the pitched helix includes cuts across a length of the pitched helix.

Optionally, the pitched helix is a rib that protrudes from a surface of the pillar.

Optionally, at least a portion of the pillars in the first array has a cross section that is hexagonal.

Optionally, the top is a truncated cone.

Optionally, a cross-section cut along a height of the top is hexagonal in shape.

Optionally, the array of pillars defines an array of air pockets shaped as spires and wherein the second material is configured to reinforce structure of the air pocket.

Optionally, the supporting structure includes a second array of pillars formed with the first material and reinforced with the second material, wherein each of the pillars in the second array includes a top and wherein the first array is supported on the tops of the second array.

Optionally, the tops in the second array are larger in size than the tops in the first array and wherein two pillars in the first array is supported on one of the tops in the second array.

Optionally, the pillars in the second array are larger in size than the pillars in the first array.

Optionally, the first material is a liquid-soluble thermoplastic.

Optionally, the second material is a photopolymer.

Optionally, the supporting structure is formed by an inkjet printing process.

According to an aspect of some example embodiments, there is provided a method for supporting an overhang in an object being built in an AM process, the method comprising: defining a volume under an overhang of the object as a support volume; building a first array of pillars in the support volume with a first material, wherein each of the pillars in the first array includes a top, wherein at least a portion of the tops in the first array adjoin and wherein the first material is support material; building reinforcements around the pillars with a second material; and building the overhang on the portion of the tops in the first array that adjoin, wherein the building of the first array of pillars and the reinforcements are performed together with the building of the object and during the same AM process.

Optionally, the method includes building a contact pad between the portion of the tops in the first array that adjoin and the overhang, wherein the building of the contact pad is performed together with the building of first array of pillars, the reinforcements and the object and during the same AM process.

Optionally, the second material is model material with which the object is built.

Optionally, the method includes building a second array of pillars in the support volume with the first material, wherein each of the pillars in the second array includes a top; and building reinforcements around the pillars in the second array with the second material; wherein the first array of pillars is built on the second array of pillars.

Optionally, the tops in the second array are larger in size than the tops in the first array and wherein two pillars in the first array is supported on one of the tops in the second array.

Optionally, the pillars in the second array are larger in size than the pillars in the first array.

Optionally, the method includes arranging the first array of pillars to define an array of air pockets shaped as spires therebetween.

Optionally, the reinforcements are configured to structurally support the air pockets.

Optionally, the AM process is inkjet printing.

According to an aspect of some example embodiments, there is provided an additive manufacturing (AM) system comprising: at least one dispensing head, wherein the at least one dispensing head includes an array of nozzles configured to selectively dispense support material and model material; a non-transitory computer readable medium on which a computer program product is stored, wherein the computer program product is configured to: receive digital data pertaining to fabrication instructions for fabricating an object by an AM process; identify a volume around the object that requires a supporting structure to structurally support at least a portion the object during fabrication; generate instructions for filling the volume with the supporting structure as defined in any one of claims 1-15; and a controller configured to control selective dispensing through the array of nozzles based on the fabrication instructions for fabricating the object and the instructions generated for filling the volume with the supporting structure.

Optionally, the system includes a first dispensing head configured to dispense the model material and a second dispensing head configured to dispense the support material.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings (including images). With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 11A, 11B, 11C are schematic side, top and bottom views of another example reinforced supporting pillar in accordance with some example embodiments;

DESCRIPTION OF SPECIFIC EMBODIMENTS OF THE INVENTION

Figure 1:
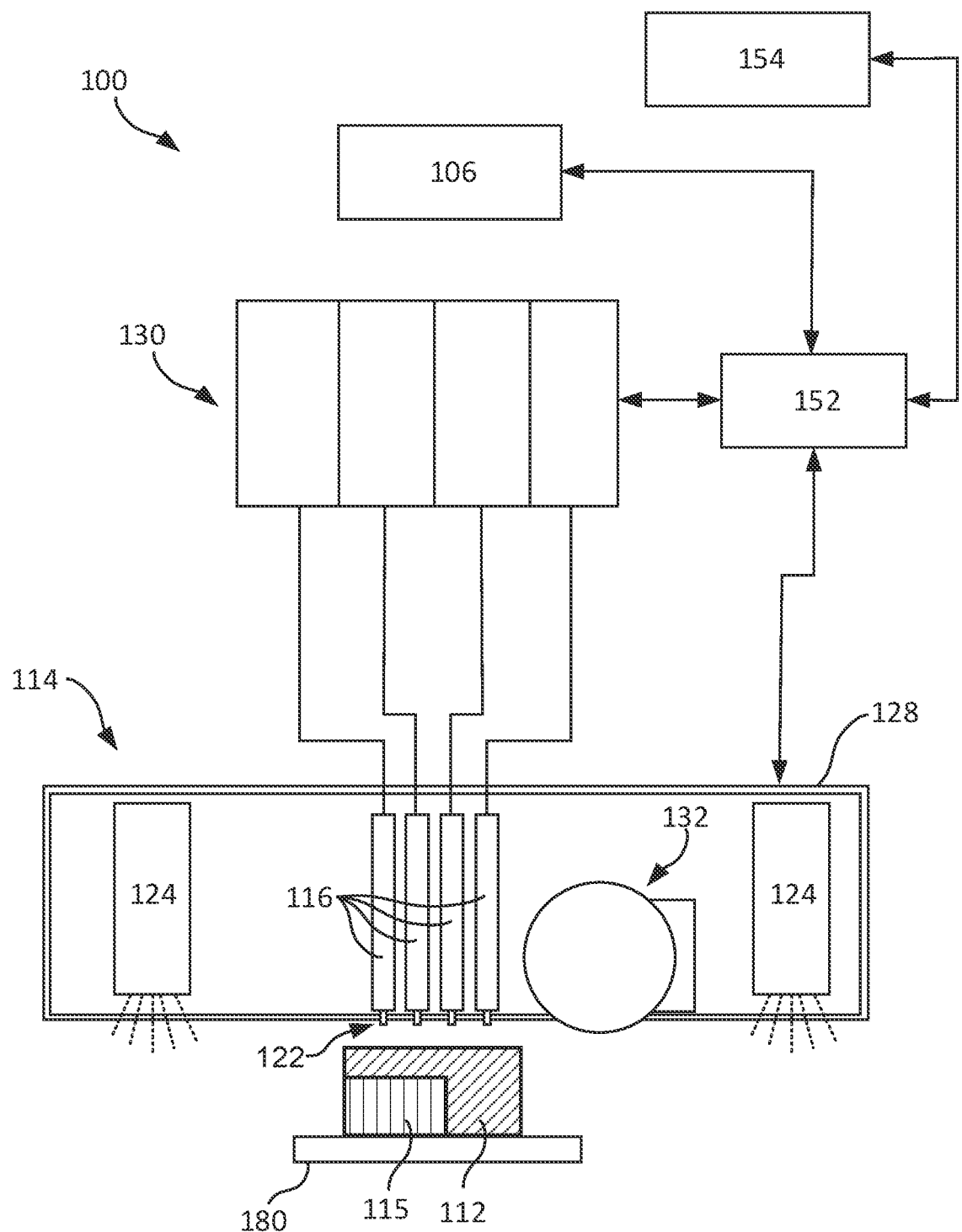
FIG. 1 is a simplified block diagram of an example ink-jet printing system for three dimensional printing for use with some example embodiments.

The present invention, in some embodiments thereof, relates to supporting structures for supporting an object during additive manufacturing and, more particularly, but not exclusively, to a method for forming the supporting structure with an additive manufacturing printing system.

According to some example embodiments, the supporting structure is defined by an array of spaced apart pillars, at least a portion of which optionally and preferably includes a top. The top may be a frustum (e.g., a truncated cone) shaped structure. In some example embodiments, the supporting structure includes stacks of pillar arrays with each stack being supported by the tops of the pillars in a lower level stack. Optionally, the stack of pillar arrays forms a multi-furcated (e.g., bifurcated or branching) pattern including larger pillars that are more sparsely spaced on lower levels of the stack as compared to upper levels of the stack that include smaller pillars that are more densely or closely spaced. The smaller pillars may be smaller in one or more of diameter and height as compared to the larger pillars constructed on the lower levels of the supporting structure. The lower and upper levels as stated herein are in reference to the order of building during the AM process such that the upper levels are built over the lower level. In some example embodiments, at least one of the pillars and the tops has a polygonal (e.g., hexagonal) cross-section.

According to some example embodiments, model material is integrated with the pillar structure in a defined pattern. Optionally, the defined pattern is an array of ribs that spiral along a height of the pillar to form a helix of ribbed model elements. The ribs may have a defined width and may be spaced from each other with a defined spacing. The strips of model material forming the ribs may be patterned on the pillars in a manner that structurally reinforces the pillars formed with support material as well as the air pockets created between the pillars, while maintaining enough exposed surface area of the support material for a liquid solution used to dissolve, soften or break down the support material at the end of the building process to react with the support material. The ribs of model material may be about 0.4 mm thick and 1.5 mm in height. According to some example embodiments, the supporting structure is further defined by a contact pad formed from a layer of support material at an interface between the supporting structure and the object, e.g. over the uppermost array of pillars. The contact pad may provide a continuous layer over which a portion of the object that is supported by the supporting structure may be built. Optionally, the tops of the pillar array directly below the contact pad, i.e. the uppermost pillar array, are configured to have adjoining edges. When the tops are formed with a polygonal (e.g., hexagonal) cross-section, they may have substantial and sufficient contact between them to form a base for the contact pad.

For purposes of better understanding of some embodiments of the present invention, as illustrated in FIGS. 5-14 of the drawings, reference is first made to the construction and operation of an ink-jet printing system for three dimensional printing as illustrated in FIGS. 1-4B.

A representative and non-limiting example of an inkjet printing system 100 suitable for AM of an object 112 according to some embodiments of the present invention is illustrated in FIG. 1. Inkjet printing system 100 may include inkjet printer 114 having a plurality of dispensing heads 116. Each head preferably includes an array of nozzles 122 through which a liquid building material is dispensed via inkjet technology. Optionally and preferably a building material supply system or apparatus 130 contains the building material containers or cartridges and supplies a plurality of building materials to dispensing heads 116 during printing. Each dispensing head 116 may be designated for dispensing one or more types of model material for forming object 112 and may also be designated for dispensing one or more types of support material for forming supporting structure 115 for object 112. Optionally, one dispensing head 116 may dispense a first building material via a first set of nozzles in array 122 and a second building material via a second set of nozzles in array 122. Although, in the representative example of FIG. 1, four dispensing heads 116 are illustrated, it is contemplated that inkjet printer 114 may optionally include fewer or more dispensing heads 116.

The building materials may differ for example in color, texture, modulus of elasticity and material strength. The model material may be a photopolymer that has a composition to give, after curing, a solid material with mechanical properties that permit the building and handling of that three-dimensional object. The solid material may be a rigid or may have elastic properties. At least one of the model materials may have higher modulus of elasticity and a greater strength as compared to the support material.

The support material may be a polymeric material and include, inter alia, at least one reactive component and at least one photo-initiator. The reactive component may be at least one of an acrylic component, a molecule having one or more vinyl ether substituent, or the reactive component is a water miscible component that is, after curing, capable of swelling upon exposure to water or to al alkaline or acidic water solution. Preferably, the support material is formulated so as to permit its fast, easy, clean and efficient removal from the object which it is supporting once the object has been printed.

Known methods for removal of support materials include water-jet impact, chemical methods, such as dissolution in a solvent, oftentimes in combination with thermal treatment. For example, for water soluble support material, the fabricated object, including its supporting structure, is immersed in water capable of dissolving the support material.

Support materials for AM are described, for example, in U.S. Pat. Nos. 6,228,923, 7,255,825, 7,479,510, 7,183,335 and 6,569,373, all to the present Assignee and being incorporated by reference in their entirety.

Inkjet printer 114 may also include a solidification system 124, e.g. hardening device, which can include any device configured to emit light, heat or the like and optionally and preferably harden one or more of the modeling material and the support material. For example, solidification system 124 may include an ultraviolet (UV) lamp that may cure or otherwise solidify the modeling material and optionally the support material. In some exemplary embodiments, inkjet printer 114 further includes a leveling device 132, e.g. a roller. Leveling device 132 may be configured to straighten, flatten and/or establish a defined layer thickness of a current layer prior to formation of the successive layer thereon.

Dispensing heads 116, solidification system 124 and leveling device 132 may be mounted on a frame or block 128 of inkjet printer 114 which is preferably operative to reciprocally move over a tray 180, which serves as the working surface. In some embodiments, solidification system 124 and leveling devices 132 are mounted in block 128 such that they follow in the wake of dispensing heads 116 to at least partially solidify (e.g., cure) the materials just dispensed by the dispensing heads. Optionally, tray 180 is configured to move in one or more directions in which block 128 is stationary.

A computerized controller 152 controls fabrication with inkjet printer 114 and optionally and preferably also controls supply system 330. Controller 152 typically includes one or more electronic circuits configured to perform the controlling operations. Controller 152 preferably communicates with a data processor 154 which transmits digital data pertaining to fabrication instructions based on computer object data, e.g., a CAD configuration represented on a computer readable medium in any of the aforementioned formats (e.g., STL). Typically, controller 152 controls the voltage applied to each dispensing head or nozzle array and the temperature of the building material in the respective printing head.

Once the manufacturing data is loaded to controller 152 it can operate without user intervention. In some embodiments, controller 152 receives additional input from the operator, e.g., using data processor 154 or using a user interface 106, e.g. a display with a keyboard, a touch screen and the like, communicating with controller 152. For example, controller 152 can receive, as additional input, one or more building material types and/or attributes, such as, but not limited to, color, characteristic distortion and/or transition temperature, viscosity, electrical property, magnetic property. Other attributes and groups of attributes are also contemplated.

Figure 2A:
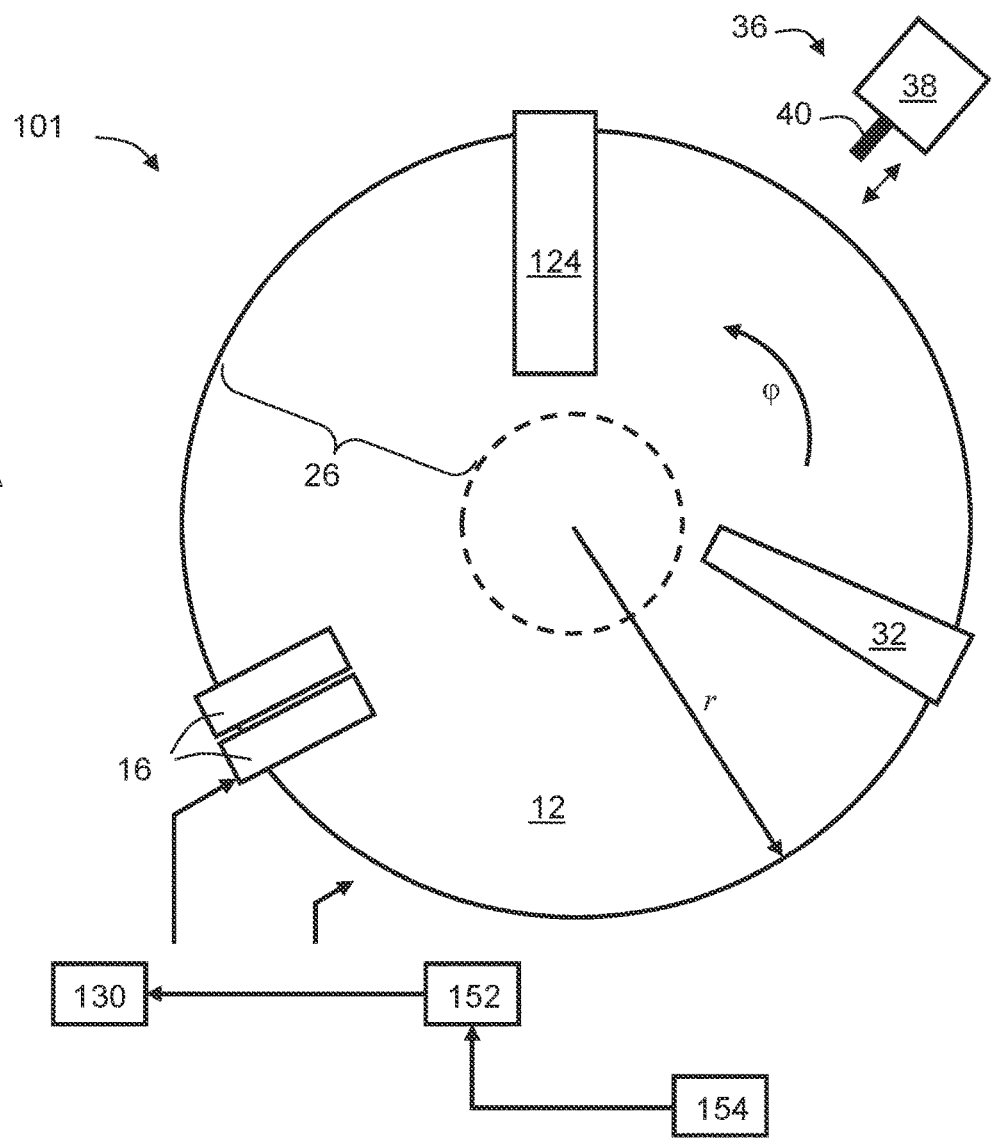
FIGS. 2A-2C are schematic illustrations of another additive manufacturing system according to some embodiments of the invention.
Figure 2B:
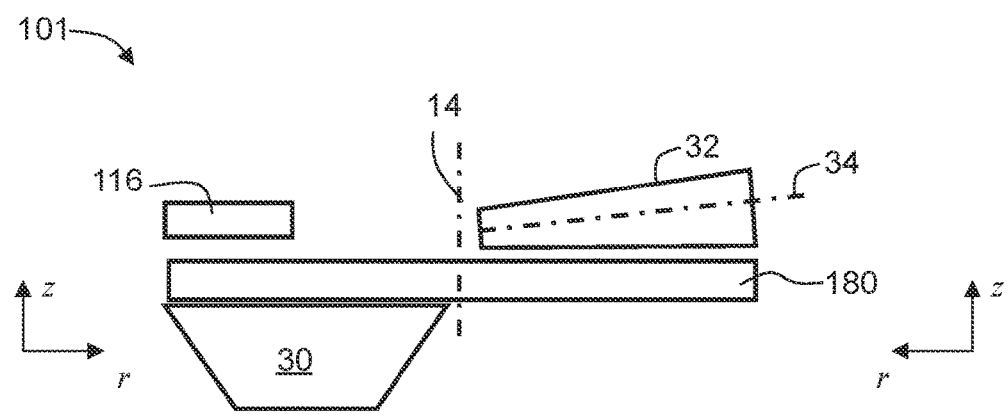
Figure 2C:
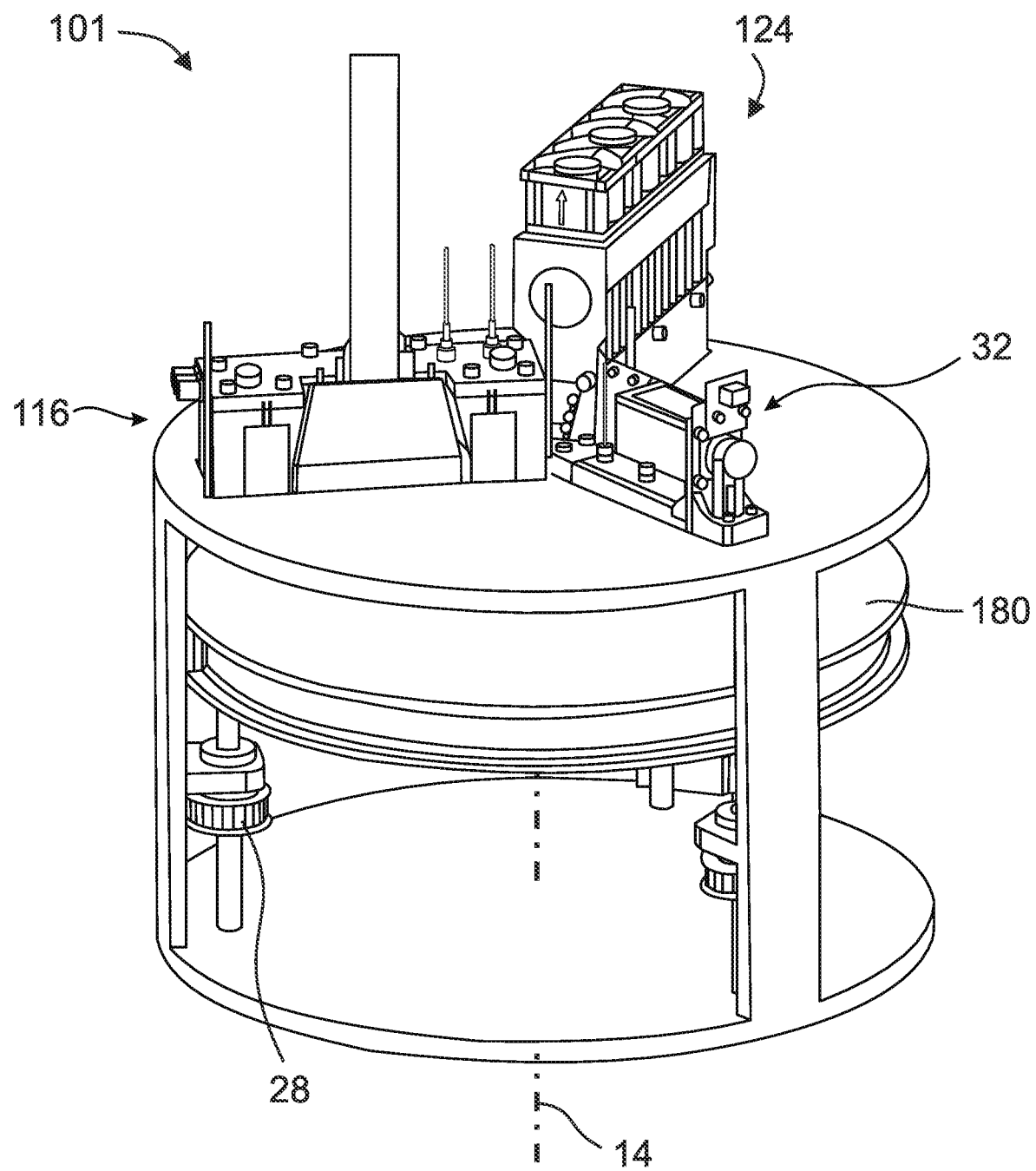

Another representative and non-limiting example of a system 101 suitable for AM of an object according to some embodiments of the present invention is illustrated in FIGS. 2A-2C. FIGS. 2A-2C illustrate a top view (FIG. 2A), a side view (FIG. 2B) and an isometric view (FIG. 2C) of system 101.

In the present embodiments, system 101 comprises a tray 180 and a plurality of inkjet printing heads 116, each having a plurality of separated nozzles. Tray 180 can have a shape of a disk or it can be annular. Non-round shapes are also contemplated, provided they can be rotated about a vertical axis.

Tray 180 and heads 116 are optionally and preferably mounted such as to allow a relative rotary motion between tray 180 and heads 116. This can be achieved by (i) configuring tray 180 to rotate about a vertical axis 14 relative to heads 116, (ii) configuring heads 116 to rotate about vertical axis 14 relative to tray 180, or (iii) configuring both tray 180 and heads 116 to rotate about vertical axis 14 but at different rotation velocities (e.g., rotation at opposite direction).

While the embodiments below are described with a particular emphasis to configuration (i) wherein the tray is a rotary tray that is configured to rotate about vertical axis 14 relative to heads 116, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 180 and pointing outwardly from axis 14 is referred to as the radial direction r, a direction parallel to tray 180 and perpendicular to the radial direction r is referred to herein as the azimuthal direction $\varphi$, and a direction perpendicular to tray 180 is referred to herein is the vertical direction z.

The term "radial position," as used herein, refers to a position on or above tray 180 at a specific distance from axis 14. When the term is used in connection to a printing head, the term refers to a position of the head which is at specific distance from axis 14. When the term is used in connection to a point on tray 180, the term corresponds to any point that belongs to a locus of points that is a circle whose radius is the specific distance from axis 14 and whose center is at axis 14.

The term "azimuthal position," as used herein, refers to a position on or above tray 180 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 180 serves as a supporting structure for three-dimensional printing. The working area on which one or objects are printed is typically, but not necessarily, smaller than the total area of tray 180. In some embodiments of the present invention the working area is annular. The working area is shown at 26. In some embodiments of the present invention tray 180 rotates continuously in the same direction throughout the formation of object, and in some embodiments of the present invention tray reverses the direction of rotation at least once (e.g., in an oscillatory manner) during the formation of the object. Tray 180 is optionally and preferably removable. Removing tray 180 can be for maintenance of system 101, or, if desired, for replacing the tray before printing a new object. In some embodiments of the present invention system 101 is provided with one or more different replacement trays (e.g., a kit of replacement trays), wherein two or more trays are designated for different types of objects (e.g., different weights) different operation modes (e.g., different rotation speeds), etc. The replacement of tray 180 can be manual or automatic, as desired. When automatic replacement is employed, system 101 comprises a tray replacement device 36 configured for removing tray 180 from its position below heads 116 and replacing it by a replacement tray (not shown). In the representative illustration of FIG. 2A tray replacement device 36 is illustrated as a drive 38 with a movable arm 40 configured to pull tray 180, but other types of tray replacement devices are also contemplated.

Figure 3A:
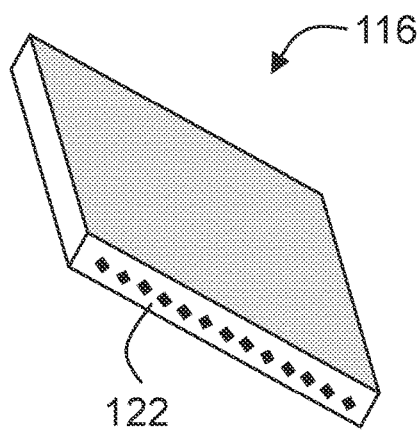
FIGS. 3A-3C are schematic illustrations of printing heads according to some embodiments of the present invention.
Figure 3B:
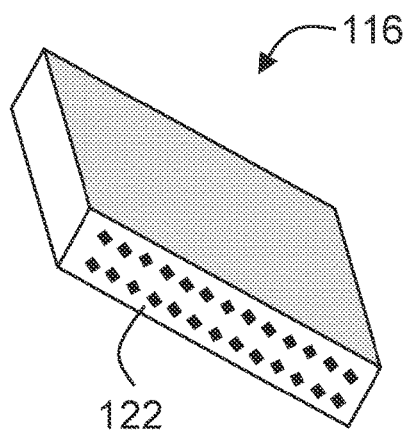
Figure 3C:
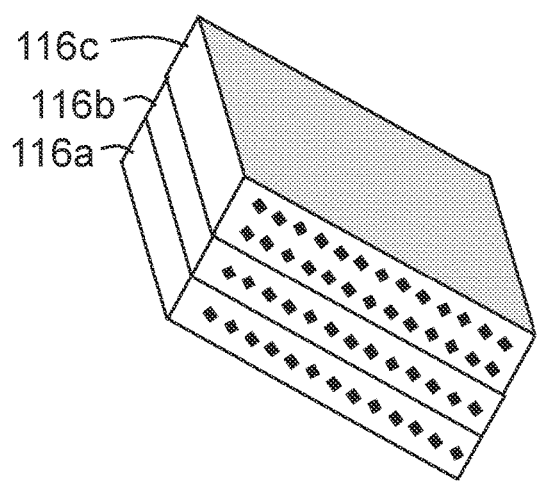

Exemplified embodiments for the printing head 116 are illustrated in FIGS. 3A-3C. These embodiments can be employed for any of the AM systems described above, including, without limitation, system 100 and system 101.

FIGS. 3A-B illustrate a printing head 116 with one (FIG. 3A) and two (FIG. 3B) nozzle arrays 122. The nozzles in the array are preferably aligned linearly, along a straight line. In embodiments in which a particular printing head has two or more linear nozzle arrays, the nozzle arrays are optionally and preferably can be parallel to each other.

When a system similar to system 100 is employed, all printing heads 116 are optionally and preferably oriented along the indexing direction with their positions along the scanning direction being offset to one another.

When a system similar to system 101 is employed, all printing heads 116 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position (pi, and another head can be oriented radially and positioned at azimuthal position $\varphi_2$. In this example, the azimuthal offset between the two heads is $\varphi_1-\varphi_2$, and the angle between the linear nozzle arrays of the two heads is also $\varphi_1-\varphi_2$.

In some embodiments, two or more printing heads can be assembled to a block of printing heads, in which case the printing heads of the block are typically parallel to each other. A block including several inkjet printing heads 116a, 116b, 116c is illustrated in FIG. 3C. In some embodiments, system 101 comprises a stabilizing structure 30 positioned below heads 116 such that tray 180 is between support structure 30 and heads 116. Stabilizing structure 30 may serve for preventing or reducing vibrations of tray 180 that may occur while inkjet printing heads 116 operate. In configurations in which printing heads 116 rotate about axis 14, stabilizing structure 30 preferably also rotates such that stabilizing structure 30 is always directly below heads 116 (with tray 180 between heads 116 and tray 180).

Tray 180 and/or printing heads 116 is optionally and preferably configured to move along the vertical direction z, parallel to vertical axis 14 so as to vary the vertical distance between tray 180 and printing heads 116. In configurations in which the vertical distance is varied by moving tray 180 along the vertical direction, stabilizing structure 30 preferably also moves vertically together with tray 180. In configurations in which the vertical distance is varied by heads 116 along the vertical direction, while maintaining the vertical position of tray 180 fixed, stabilizing structure 30 is also maintained at a fixed vertical position.

The vertical motion can be established by a vertical drive 28. Once a layer is completed, the vertical distance between tray 180 and heads 116 can be increased (e.g., tray 180 is lowered relative to heads 116) by a predetermined vertical step, according to the desired thickness of the layer subsequently to be printed. The procedure is repeated to form a three-dimensional object in a layer-wise manner.

In some embodiments of the invention, system 101 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 180 and its surface is parallel to the surface of the tray. This embodiment is illustrated in the side view of system 101 (FIG. 2B).

The conical roller can have the shape of a cone or a conical frustum.

The opening angle of the conical roller is preferably selected such that is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p.

In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 180).

In some embodiments of the present invention printing heads 116 are configured to reciprocally move relative to tray along the radial direction r. These embodiments are useful when the lengths of the nozzle arrays 122 of heads 116 are shorter than the width along the radial direction of the working area 26 on tray 180. The motion of heads 116 along the radial direction is optionally and preferably controlled by controller 152.

Any of systems 100 and 101 may optionally and preferably comprise a solidifying device 124 which can include any device configured to emit light, heat or the like that may cause the deposited material formulation to hardened. For example, solidifying device 124 can comprise one or more radiation sources, which can be, for example, an ultraviolet or visible or infrared lamp, or other sources of electromagnetic radiation, or electron beam source, depending on the modeling material formulation being used. The radiation source can include any type of radiation emitting device, including, without limitation, light emitting diode (LED), digital light processing (DLP) system, resistive lamp and the like. In some embodiments of the present invention, solidifying device 124 serves for curing or solidifying the modeling material formulation.

In any of systems 100 and 101, the operation of the inkjet printing heads and optionally and preferably also of one or more other components of the system, e.g., the motion of the tray, the operation of the supply system, the activation, deactivation, applied voltage, and position along the vertical and/or horizontal direction of the leveling device and/or the solidifying device, etc. are controlled by a controller 152. The controller can have an electronic circuit and a non-volatile memory medium readable by the circuit, wherein the memory medium stores program instructions which, when read by the circuit, cause the circuit to perform control operations as further detailed below.

The controller preferably communicates with a data processor or host computer 154 which transmits digital data pertaining to fabrication instructions based on computer object data, e.g., a Computer-Aided Design (CAD) configuration represented on a computer readable medium in a form of a Standard Tessellation Language (STL) or a Stereo-Lithography Contour (SLC) format, Virtual Reality Modeling Language (VRML), Additive Manufacturing File (AMF) format, Drawing Exchange Format (DXF), Polygon File Format (PLY) or any other format suitable for CAD. Typically, the controller controls the voltage applied to each dispensing head or nozzle array and the temperature of the building material formulation in the respective printing head. Generally, controller 152 controls printing heads to dispense, droplets of building material formulation in layers, such as to print a three-dimensional object. In system 101, controller 152 optionally and preferably controls the printing heads to dispense the droplets while the tray is rotating.

In some embodiments, the controller receives additional input from the operator, e.g., using data processor 154 or using a user interface 116 communicating with the controller. User interface 116 can be of any type known in the art, such as, but not limited to, a keyboard, a touch screen and the like. For example, controller 152 can receive, as additional input, one or more building material formulation types and/or attributes, such as, but not limited to, color, characteristic distortion and/or transition temperature, viscosity, electrical property, magnetic property. Other attributes and groups of attributes are also contemplated.

The object data formats are typically structured according to a Cartesian system of coordinates. In these cases, when system 101 is employed, computer 154 preferably executes a procedure for transforming the coordinates of each slice in the computer object data from a Cartesian system of coordinates into a polar system of coordinates. Computer 154 optionally and preferably transmits the fabrication instructions in terms of the transformed system of coordinates. Alternatively, computer 154 can transmit the fabrication instructions in terms of the original system of coordinates as provided by the computer object data, in which case the transformation of coordinates is executed by the circuit of controller 152.

Figure 4A:
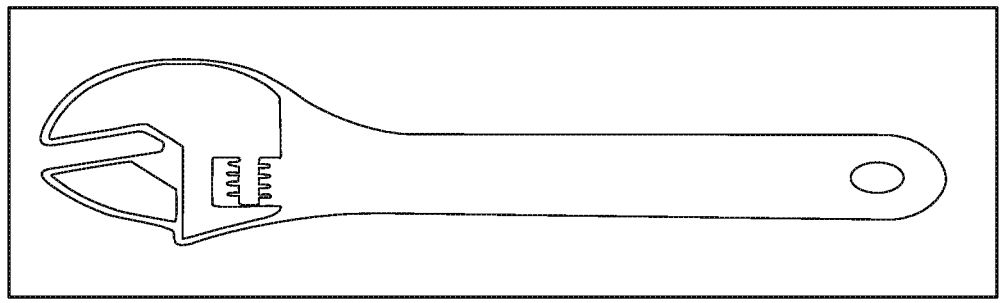
FIGS. 4A and 4B are schematic illustrations demonstrating coordinate transformations according to some embodiments of the present invention.
Figure 4B:
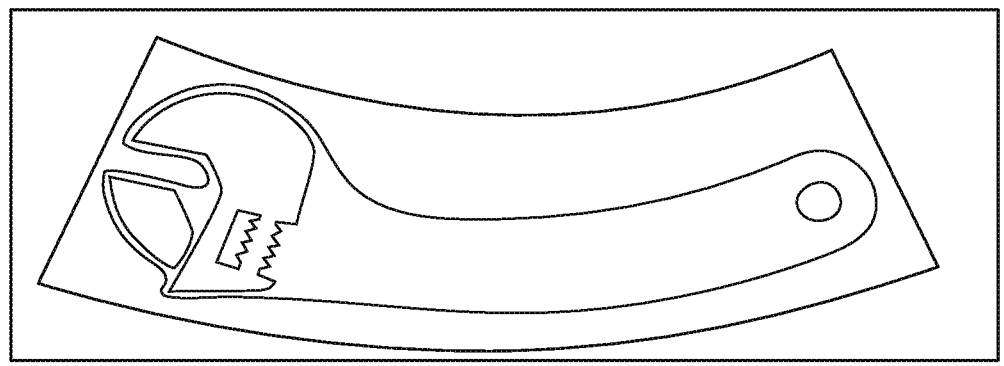

The transformation of coordinates allows three-dimensional printing over a rotating tray. In system 101, not all the nozzles of the head points cover the same distance over tray 180 during at the same time. The transformation of coordinates is optionally and preferably executed so as to ensure equal amounts of excess material formulation at different radial positions. Representative examples of coordinate transformations according to some embodiments of the present invention are provided in FIGS. 4A-B, showing three slices of an object (each slice corresponds to fabrication instructions of a different layer of the objects), where FIG. 4A illustrates a slice in a Cartesian system of coordinates and FIG. 4B illustrates the same slice following an application of a transformation of coordinates procedure to the respective slice.

Some embodiments contemplate the fabrication of an object by dispensing different material formulations from different dispensing heads. These embodiments provide, inter alia, the ability to select material formulations from a given number of material formulations and define desired combinations of the selected material formulations and their properties. According to the present embodiments, the spatial locations of the deposition of each material formulation with the layer is defined, either to effect occupation of different three-dimensional spatial locations by different material formulations, or to effect occupation of substantially the same three-dimensional location or adjacent three-dimensional locations by two or more different material formulations so as to allow post deposition spatial combination of the material formulations within the layer, thereby to form a composite material formulation at the respective location or locations.

Any post deposition combination or mix of modeling material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations is formed.

The present embodiments thus enable the deposition of a broad range of material formulation combinations, and the fabrication of an object which may consist of multiple different combinations of material formulations, in different parts of the object, according to the properties desired to characterize each part of the object.

Further details on the principles and operations of an AM system suitable for the present embodiments are found in U.S. Published Application Nos. 20100191360 and 20170173886, the contents of which are hereby incorporated by reference.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Figure 5:
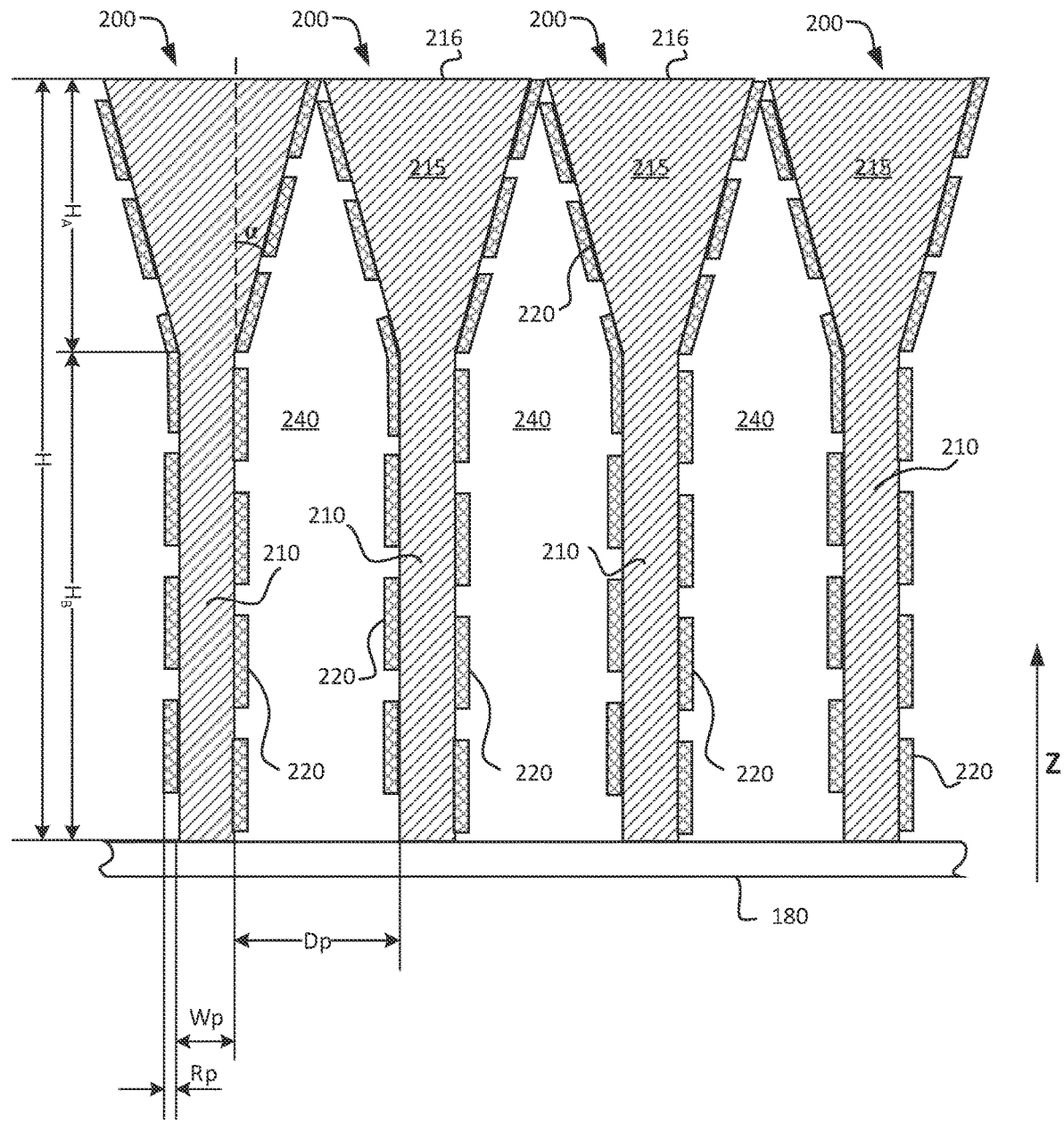
FIG. 5 is a schematic cross-sectional view of four example supporting pillars in an array of supporting pillars in accordance with some example embodiments.

FIG. 5 shows a schematic cross-sectional view of four example pillars in an array of pillars in accordance with some example embodiments. According to some example embodiments, a supporting structure for supporting a portion of an object during AM includes an array of pillars 200 that form therebetween an array of air pockets or air channels 240. The array of pillars 200 may be built over a building tray 180, over another array of pillars 200, over a contact pad, over a carpet and/or pedestal structure, or over a portion of an object.

In some example embodiments, a pillar 200 includes a column 210 and a top 215 that expands outwardly and upwardly from column 210. Top 215 is configured to expand a surface area of pillar 200 and provide a surface for an additional array of pillars 200, for a contact pad on which a portion of an object may be built, and/or for a portion of the object being printed. Optionally, top 215 is shaped as a frustum with a 'base' 216 of the frustum cone facing upwards. The direction upwards as used herein is in reference a direction Z in layers that are added during the AM process. Optionally, pillars 200 in pillar arrays are arranged to create contact between their tops. A surface created by the adjoining edges of tops 215 may provide a base over which another array of pillars, the object or the contact pad may be built. In some example embodiments, a base of top 215 is shaped as a polygon (e.g., a hexagon), so that the horizontal cross-section (perpendicularly to the Z direction) of top 215 is polygonal (e.g., hexagonal). The polygon shape, more preferably hexagonal shape, improves the ability to pack pillars 200 with adjoining tops 215. Optionally, a horizontal cross-section of column 210 is also shaped as a polygon (e.g., hexagon). In some example embodiments, air pockets 240 formed between adjoining pillars 200 have a spire shape defined by pillars 200 that surround and form air pocket 240. When the spire shape has a polygonal (e.g., hexagonal) base and cross-section due to the surrounding pillars 200, a structural stability of the air pockets formed may be improved.

According to some example embodiments, pillar 200 including both column 210 and top 215 may be formed by support material. The air pockets 240 that are formed between pillars 200 provide for reducing volume of support material needed to provide the supporting structure and improving the ease in which the supporting structure may later be removed.

In some example embodiments, a structural reinforcement 220 is formed with model material to reinforce pillars 200 and support air pockets 240, e.g. the air pockets. Suitable modeling materials can be any modeling materials marketed by Stratasys Ltd., Israel, such as, but not limited to, the Vero™ Family of materials, and the like.

In some example embodiments, structural reinforcement 220 extends from pillars 200 and protrudes into air pockets 240. Optionally, structural reinforcement 220 is formed with a pattern of model material that partially exposes the support material included in pillar 200. The partial exposure provides exposed surface area of support material which a liquid solvent (e.g., water) may contact and thus facilitate removal of the support material at the end of the AM process. Optionally, the ratio between support material for forming column 210 and top 215 and model material for forming structural reinforcement 220 is from about 1:1 to about 15:1, e.g., about 10:1. Such ratio can provide adequate structural support while conserving the amount of material that needs to be sacrificed at the end of the building process.

According to some example embodiments, parameters of the supporting structure formed with an array of pillars 200 may be defined based on a volume of the supporting structure required, shape of the supporting structure required as well as one or more of the model material and support material used to build the supporting structure. In some example embodiments, a diameter, 'Wp' of columns 210 may be from about 0.5 to about 3 mm and a height, 'H' of pillar 200 may be from about 0.3 to about 1.0 cm. Top 215 may fan out of column 210 at an angle, 'α' of from about 5° to about 15°. A ratio between height $H_B$ of column 210 and height, '$H_A$' of top 215 may be between 5:1 to about 1:12, e.g. 1:6. Based on these exemplary dimensions, a distance, 'Dp' between columns 210 may range from about 2 mm to about 10 mm or more. In some example embodiments, structural reinforcement 220 is configured to protrude out of column 210 and top 215 at a protrusion depth, 'Rp' of from about 0.3 to about 1 mm, e.g. about 0.6 mm.

Figure 6A:
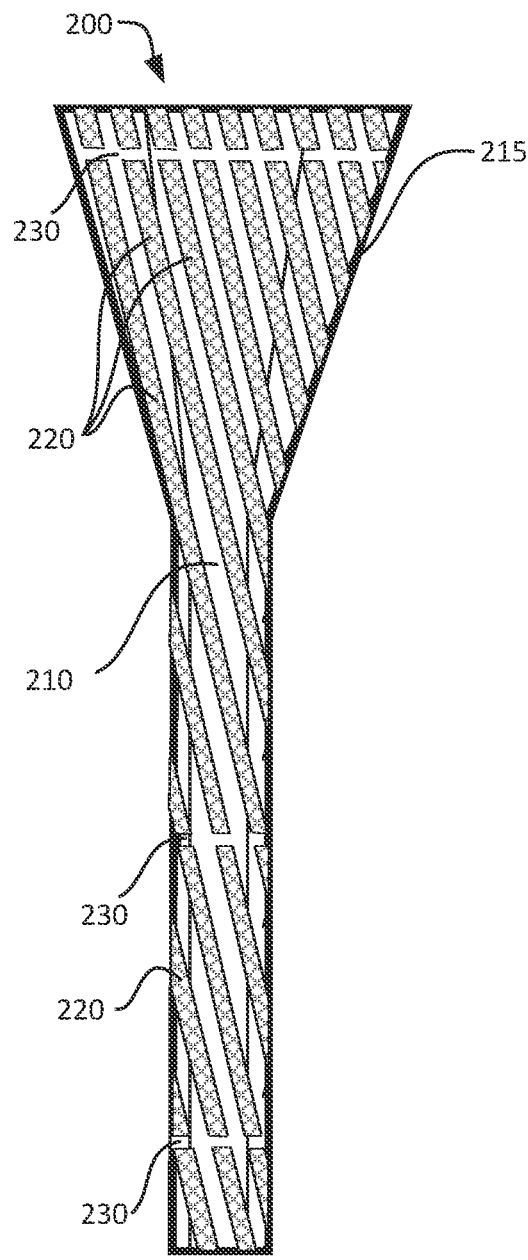
FIGS. 6A, 6B and 6C are, respectively, a schematic side, top and bottom view of a reinforced supporting pillar in accordance with some example embodiments.
Figure 6B:
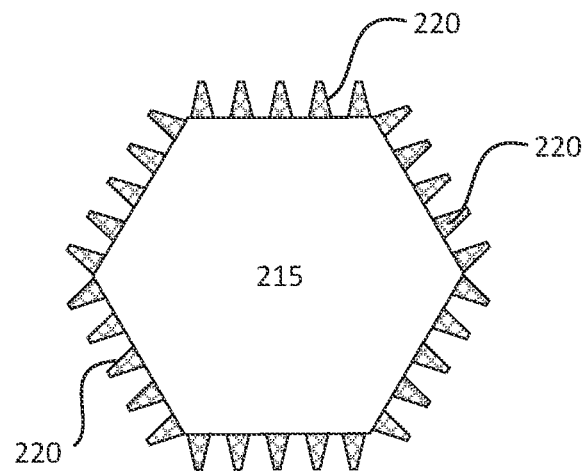
Figure 6C:
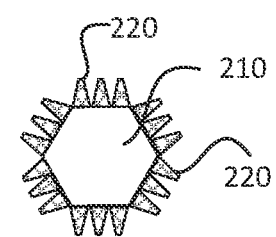

FIGS. 6A, 6B and 6C are schematic side (FIG. 6A), top (FIG. 6B) and bottom (FIG. 6C) views of an example reinforced pillar in accordance with some example embodiments. According to some example embodiments, structural reinforcement 220 includes a plurality of ribs that form a helix around pillar 200. The ribs may have a triangular cross section that extends out of support material forming top 215 and column 210 as depicted in FIGS. 6B and 6C respectively or alternatively may be formed with other geometries. In some example embodiments, the helix includes one or more cuts 230 to further expose the support material in pillar 200. While this weakens the reinforcement to some extent, it was found by the inventors that such a configuration provides adequate reinforcement while still facilitating removal of the supporting structure at the end of the building process. Optionally, the model material may cover from about 50% to about 100%, for instance about 70% to about 95% of the surface area of pillar 200. Optionally, model material may be embedded within the support material forming column 210 and/or top 215 of pillar 200. In such embodiments, the embedded model material may be homogenously or heterogeneously distributed within the bulk support material and may have a predetermined or random structure (e.g. lines, dots, helix).

Figure 7A:
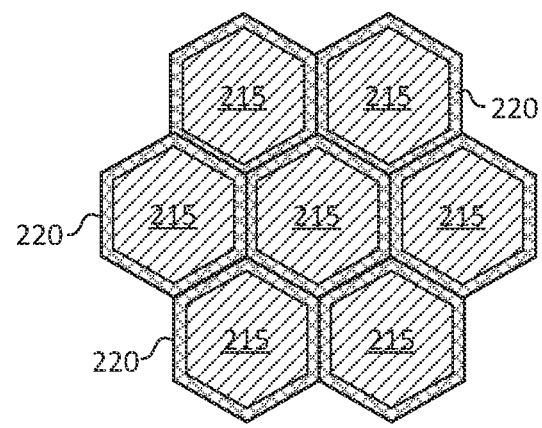
FIGS. 7A and 7B are two dimensional top and side views of an example array of supporting pillars forming air pockets between them.
Figure 7B:
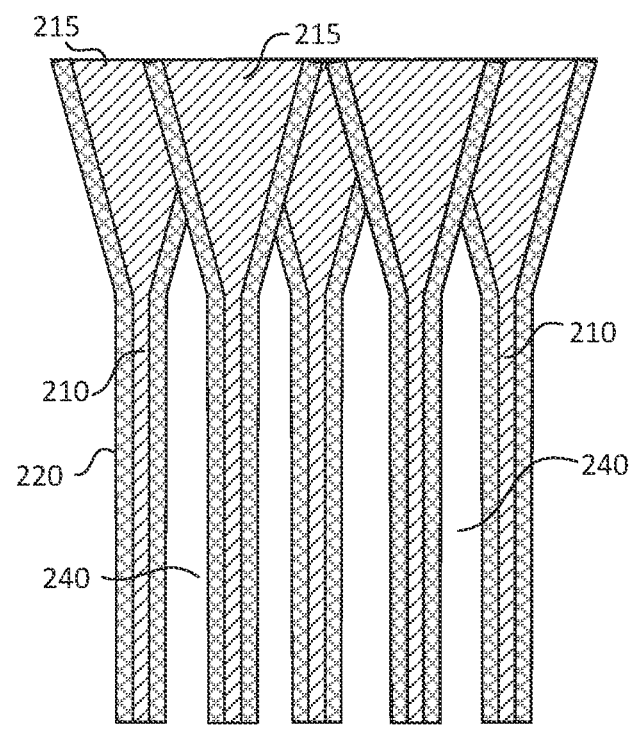
Figure 8:
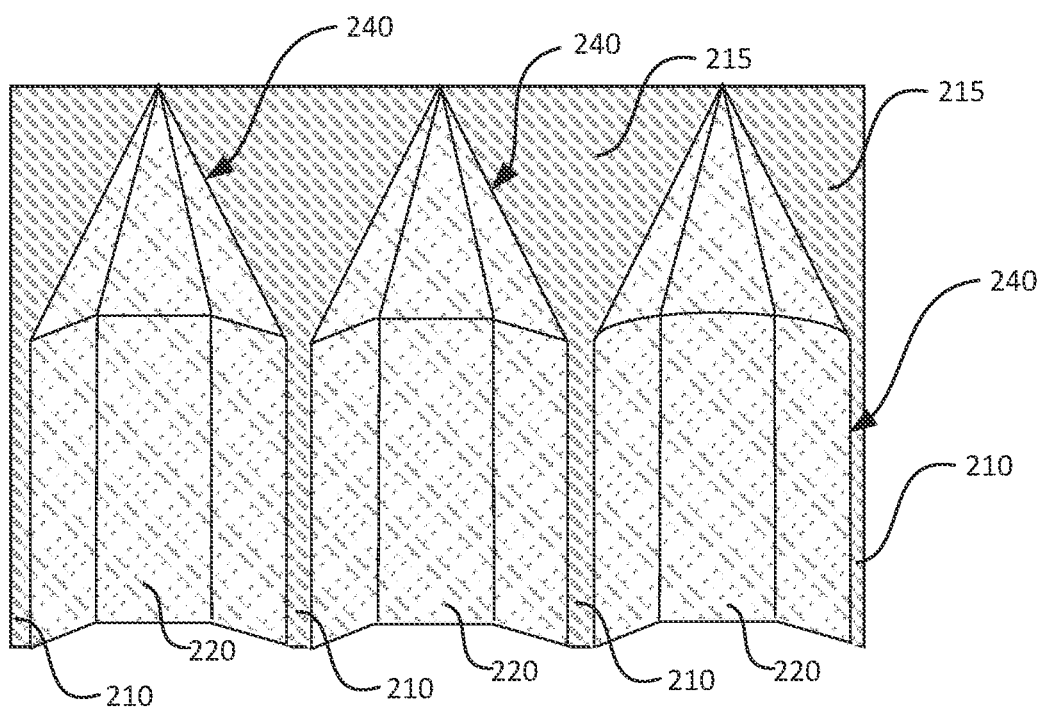
FIG. 8 is a schematic cross-sectional view of three air pockets in accordance with some example embodiments.

FIGS. 7A and 7B show two dimensional top (FIG. 7A) and side (FIG. 7B) views of an example array of pillars forming air pockets, and FIG. 8 shows a schematic cross-sectional view of three air pockets both in accordance with some example embodiments. In some example embodiments, a two dimensional array of pillars 200 may be arranged to form a continuous surface with adjoining tops 215 and a plurality of air pockets 240 below the continuous surface formed. Optionally, pillars 200 have a hexagonal cross-section and may be arranged in a honeycomb structure (FIG. 7A) to form the continuous surface. When pillars 200 have a hexagonal cross-section and are arranged to have adjoining tops, the air pocket 240 have a hexagonal base (FIG. 8). The reinforcement structures 220 around pillars 200 may also structurally support the air pocket.

Figure 9:
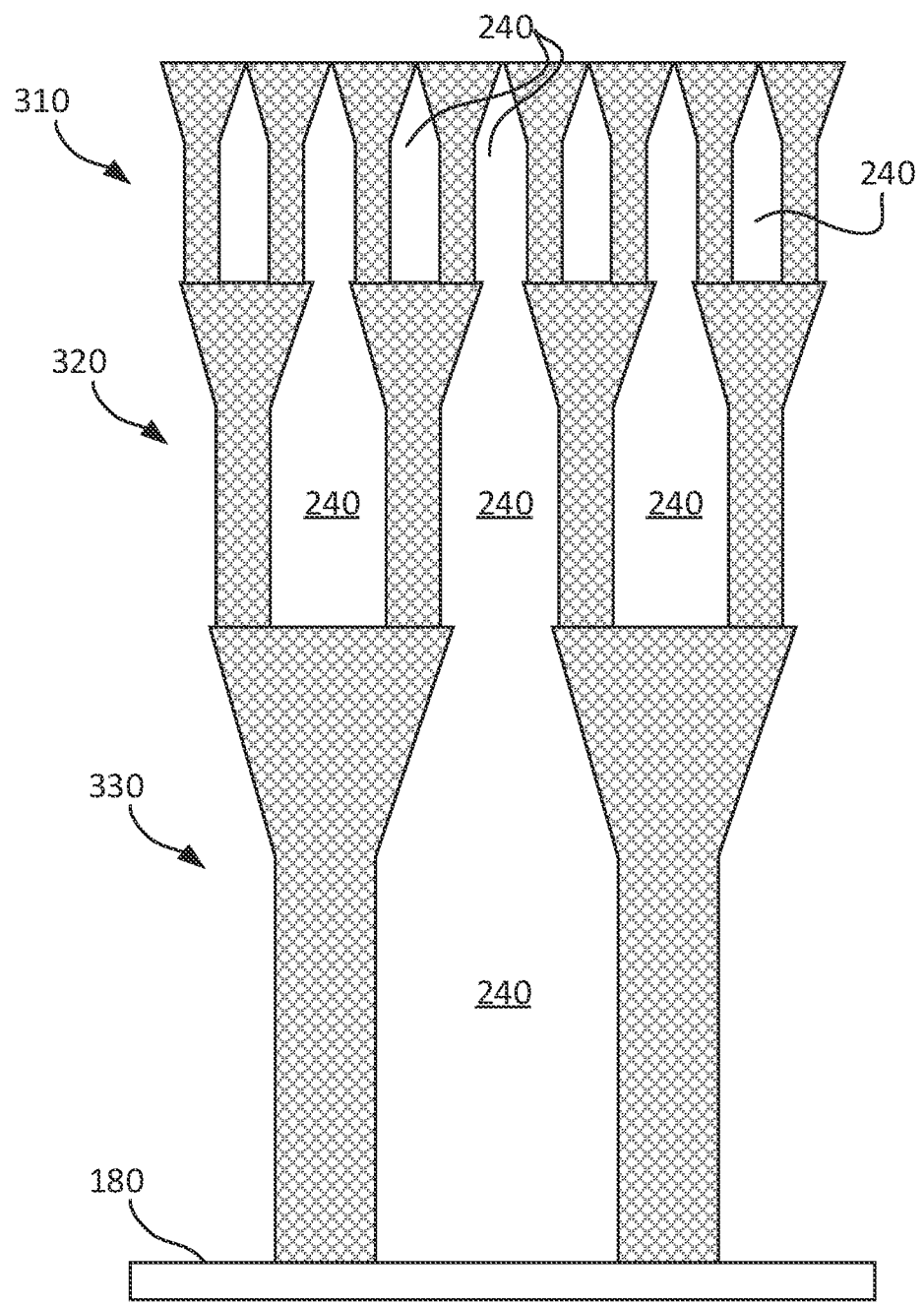
FIG. 9 is a schematic drawing of an example stack of supporting pillar arrays in accordance with some example embodiments.

FIG. 9 is a schematic illustration of an example stack of pillar arrays in accordance with some example embodiments. According to some example embodiments, a supporting structure may be formed from a stack of pillar arrays. Starting from the bottom of the stack, e.g. level 330, each stack may be configured to support an additional stack. For example, each of one or more stacks in level 330 is configured to support one or more stacks in level 320, and each of one or more stacks in level 320 is configured to support one or more stacks in level 330. Optionally, while the uppermost stack e.g. level 310 may be configured to have adjoining tops, so as to form a continuous surface on which an object or a contact pad may be built, the lower levels stacks, e.g. level 320 and level 330 may be formed with pillars that have spaced apart tops. As such, larger and open-ended air pockets may be formed on the lower levels, e.g. level 320 and level 330 as compared to the upper level, e.g. level 310, that creates air pockets in the form of spires. In some example embodiments, relatively taller and wider pillars are built in lower levels, e.g. level 330 and shorter and narrower pillars are formed in upper levels, e.g. level 310. The larger pillars in the lower levels are configured to support more than one smaller pillar in a subsequent level. In this manner the stacks of pillars form a tree-like supporting structure. Optionally, the tree-like supporting structure is formed with a multi-furcation (e.g., bifurcation or branching) pattern where each pillar in a lower level supports two or more smaller pillars in a subsequent layer. In some example embodiments, the tree-like supporting structure, e.g. the multi-furcation pattern is defined to create an array of pillars in the uppermost level with adjoining tops so as to form a continuous surface on which a contact pad or an object may be formed.

Figure 10A:
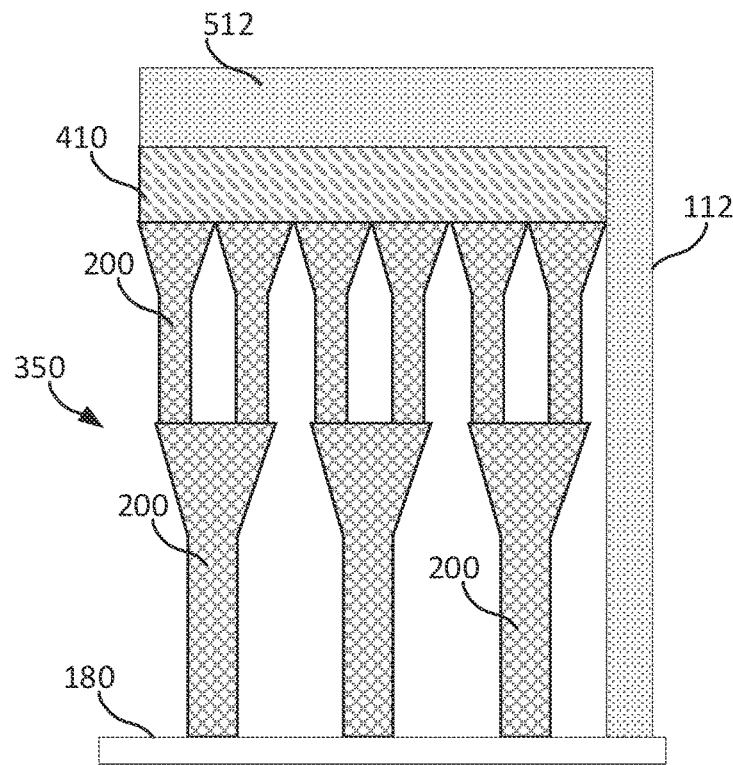
FIGS. 10A and 10B are two schematic drawings of an example object supported by a supporting structure in accordance with some example embodiments.
Figure 10B:
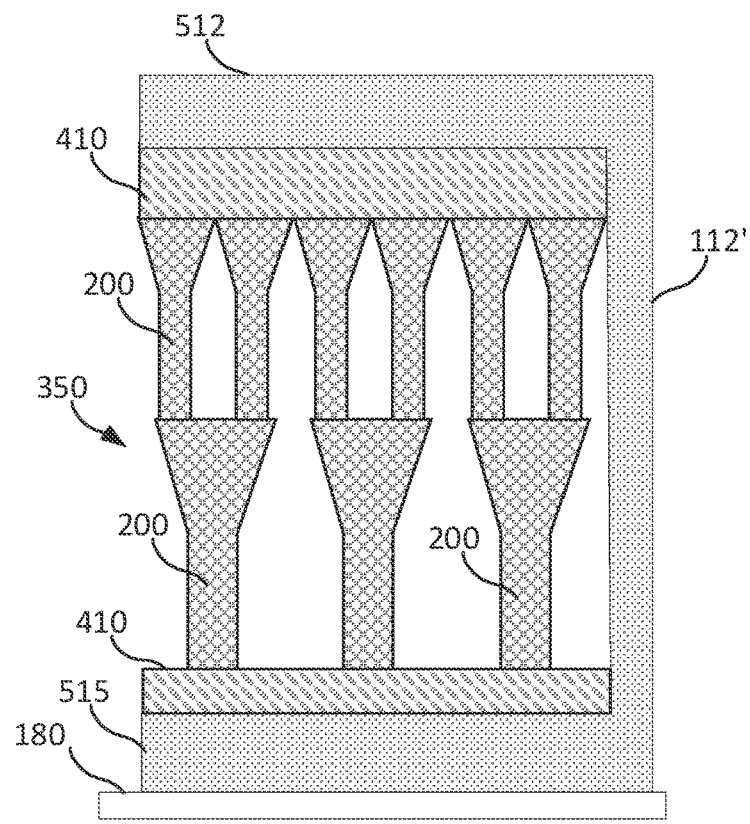

FIGS. 10A and 10B show two schematic drawings of an example objects supported by a supporting structure in accordance with some example embodiments. An object 112 or 112' may include an overhang 512 that may require a supporting structure underneath it to support building overhang 512. In some example embodiments, the supporting structure is defined as a tree-like structure 350 formed with stacks of pillars 200 as further detailed hereinabove. Tree-like structure 350 may be built directly on a building surface, e.g. tray 180 or may be built over a contact pad 410 (FIG. 10B). In some example embodiments, contact pad 410 is built as a base of the supporting structure when the supporting structure is built over a portion of the object, e.g. portion 515 of object 112'. According to some example embodiments, the supporting structure additionally includes a contact pad 410 formed at the top of the supporting structure and at the interface between the supporting structure and the portion of the object, e.g. portion 512 that is being supported. Optionally, contact pad 410 can be from about 1 mm to about 2 mm in thickness and may provide a continuous, smooth surface free of modeling material on which the object may be formed.

Figures 11A, 11C:
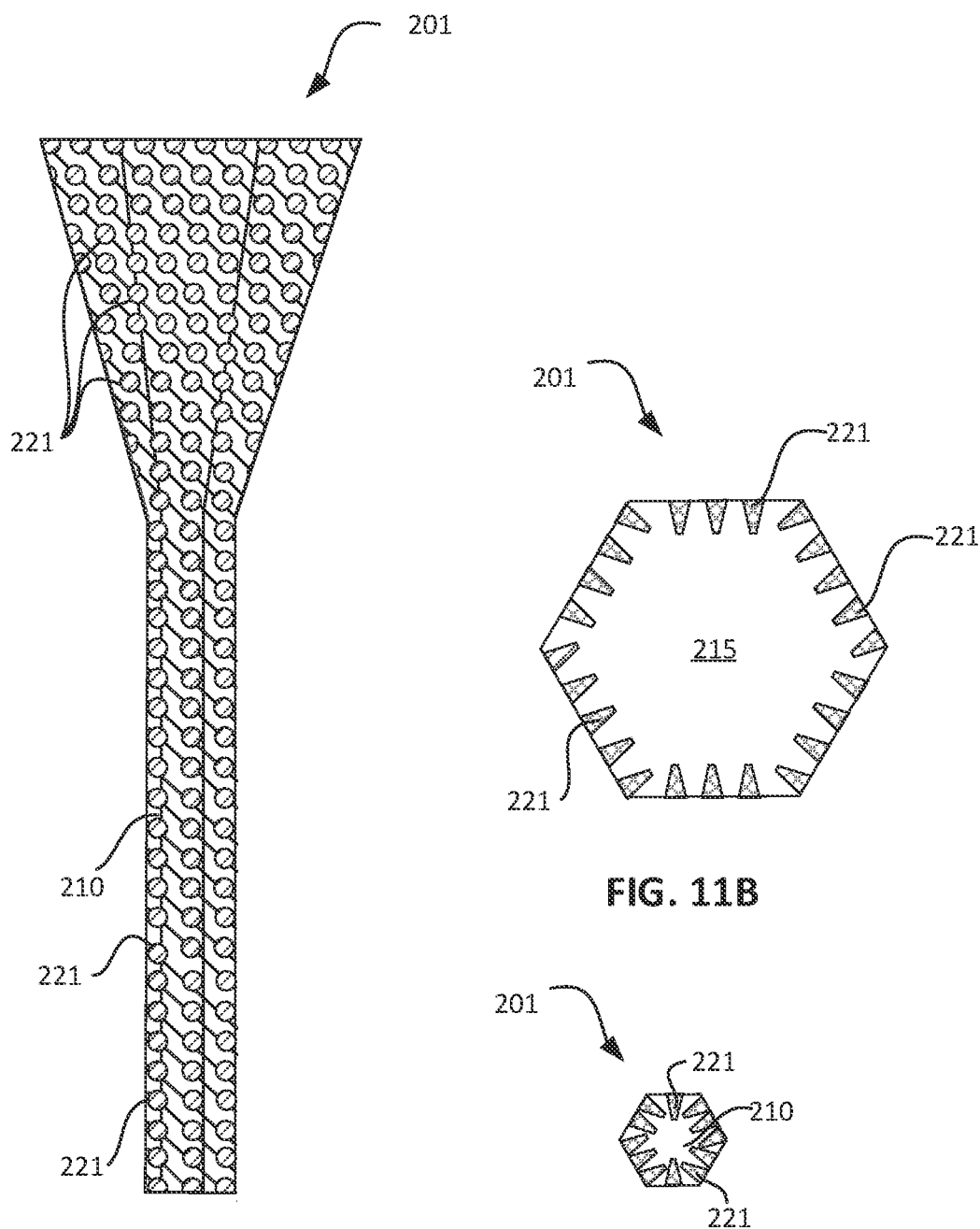

FIGS. 11A, 11B, 11C show schematic side (FIG. 11A), top (FIG. 11B) and bottom (FIG. 11C) views of another example reinforced pillar 201 in accordance with some example embodiments. Different patterns may be applied for forming structural reinforcement 221. Optionally, structural reinforcement 221 may be in the form of an array of spikes that are printed around and protrude into the support material of pillar 200. Optionally, the array of spikes may be connected.

Figure 12:
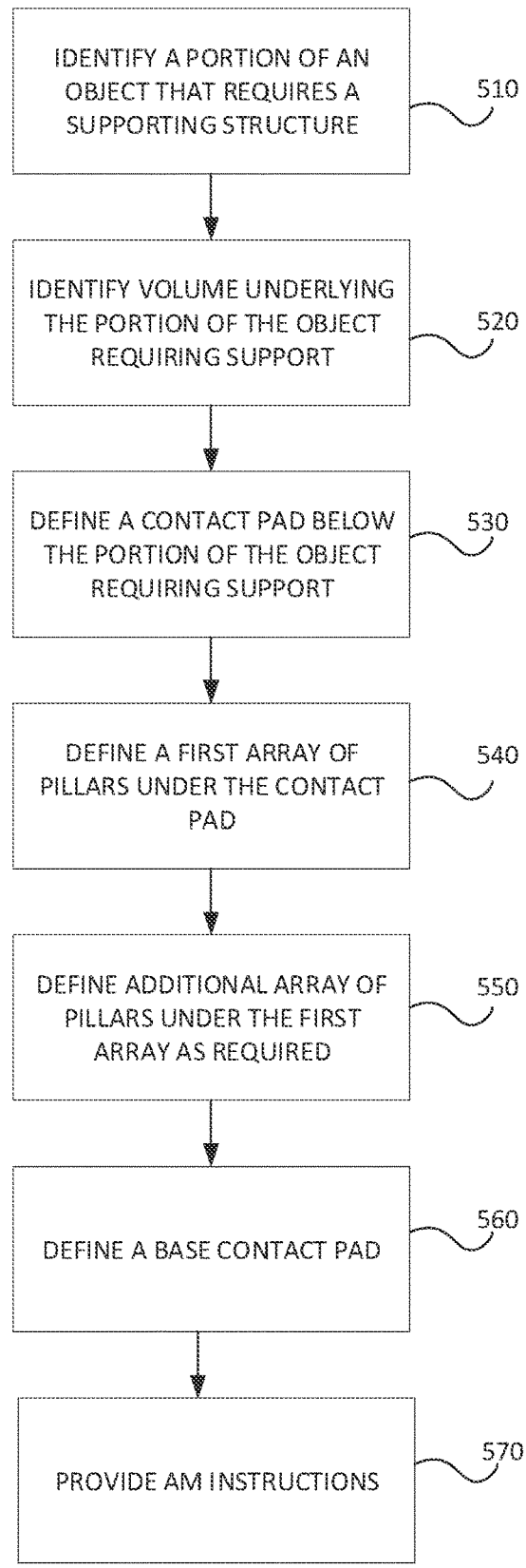
FIG. 12 is a simplified flow chart of an example method for building a supporting structure in accordance with some example embodiments.

FIG. 12 is a simplified flow chart of an example method for building a supporting structure in accordance with some example embodiments. According to some example embodiments, a portion of an object requiring supporting structure may be identified based on data defining the object that is received by a controller of an AM system (block 510). Dimensions and location of the underlying volume in which the supporting structure can be formed may be identified (block 520). According to some example embodiments, dimensions and location for a contact pad formed from support material with a defined thickness is defined (block 530). Under the contact pad, a first array of pillars is defined (block 540). This first array can be formed with pillars that have adjoining tops that may form a base on which the contact pad and then the object may be built. Depending on the height of the volume, additional arrays may be defined (block 550). It is noted that according to some example embodiments, the supporting structure may be defined from top to bottom although the supporting structure is built from bottom up. In this manner, spacing between pillars in the additional array are defined based on the arrays defined in the level above. In some examples, a bottom, contact pad may also be formed (block 560). Optionally, the contact pad may provide separation between a portion of the object formed with model material and the supporting structure that includes both model material and support material. According to some example embodiments, based on the identifications and the definitions gathered, instructions for forming the supporting structure during an AM process is provided (block 570). The instructions provided are integrated with the instructions for building the object so that the supporting structure and the object may be formed together over a same AM process.

Figure 13A:
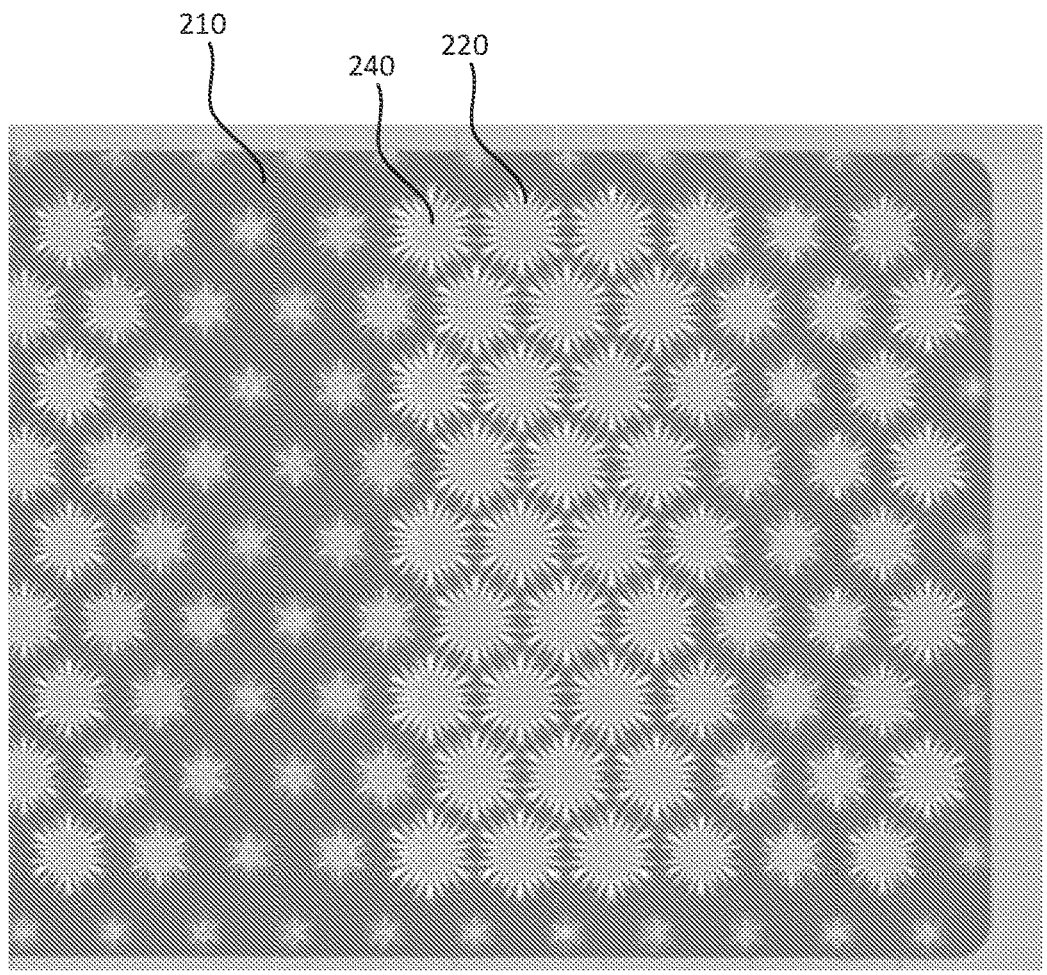
FIGS. 13A and 13B are images of example supporting structures in accordance with some example embodiments.
Figure 13B:
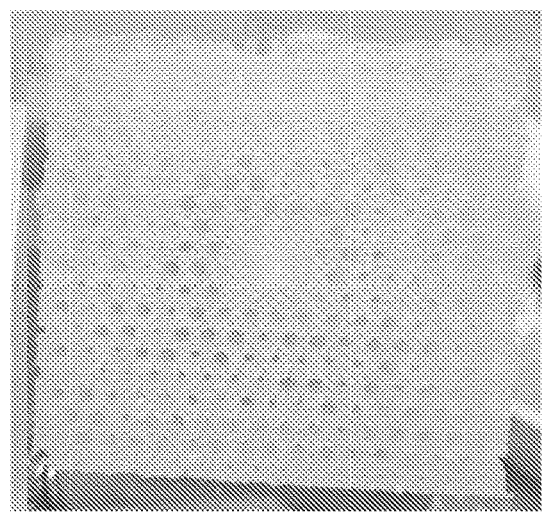

FIGS. 13A and 13B show images of example supporting structures in accordance with some example embodiments. In FIG. 13A, air pockets 240 are shown in light blue, model material forming structural reinforcement 220 is shown in white and the gray material is the support material forming pillars 200. In FIG. 13B, showing an underside (bottom) of the structure, the model material is shown in white. Support material shows as pale yellow.

Figure 14:
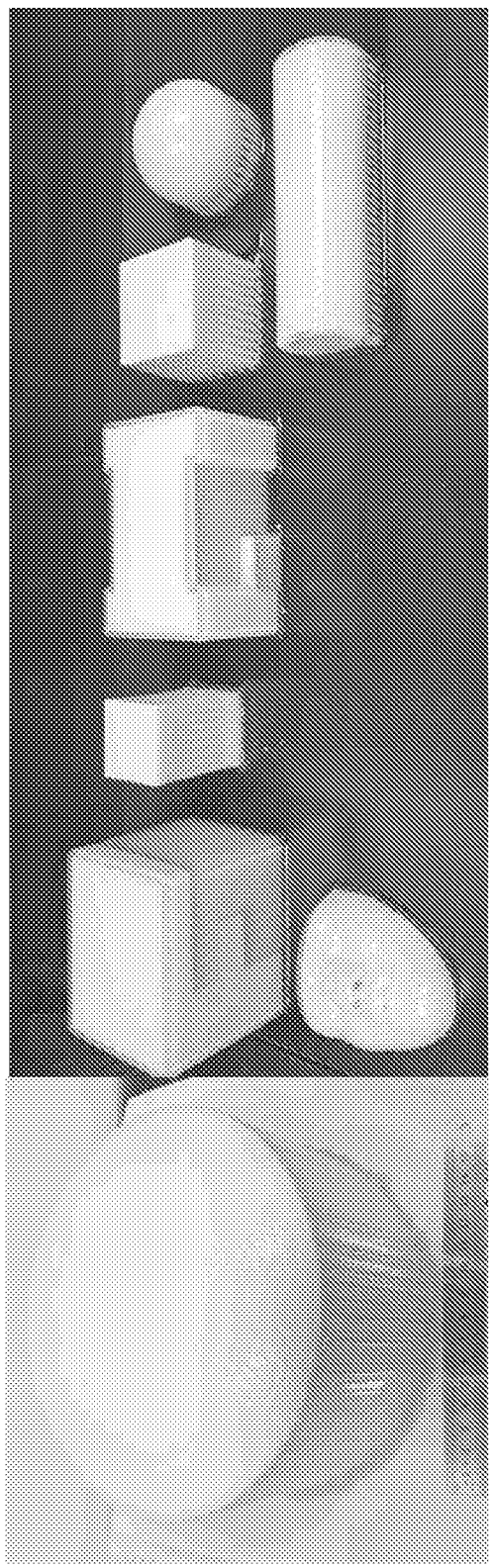
FIG. 14 is an image of a plurality of objects, each supported with example supporting structures, all in accordance with some example embodiments.

FIG. 14 is an image of a plurality of objects, each supported with example supporting structures, all in accordance with some example embodiments. The objects in the image are white and the supporting structure is yellow. The supporting structure may for example serve as a base for a rounded object, an upside pyramid or a hollowed object. In some example embodiments, at the end of the AM process, the printed block of layers is immersed in water or other liquid solvent and the supporting structure is dissolved. Optionally strains of model material included in the supporting structure are not dissolved and are otherwise discarded.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A supporting structure built together with an object in an additive manufacturing (AM) process and configured to support an overhang of the object, the supporting structure comprising:
    a first array of pillars formed with a first material and reinforced with a reinforcement formed with a second material, wherein each of the pillars in the first array includes a top;
    wherein the reinforcement forms a pitched helix along a length of at least a portion of the pillars in the first array,
    wherein at least a portion of the tops in the first array adjoin and define a surface on which the overhang of the object may be supported and wherein the first material is support material.

2. The supporting structure of claim 1, comprising a contact pad formed with the first material and configured to interface with the overhang of the object, wherein the overhang is built over the portion of the tops in the first array that are configured to adjoin.

3. The supporting structure of claim 1, wherein the pitched helix includes cuts across a length of the pitched helix.

4. The supporting structure of claim 1, wherein the pitched helix is a rib that protrudes from a surface of the pillar.

5. The supporting structure of claim 1, wherein at least a portion of the pillars in the first array has a cross section that is hexagonal.

6. The supporting structure of claim 1, wherein the top is a truncated cone.

7. The supporting structure of claim 1, wherein a cross-section cut along a height of the top is hexagonal in shape.

8. The supporting structure of claim 1, wherein the array of pillars defines an array of air pockets shaped as spires and wherein the reinforcement is configured to reinforce structure of the air pocket.

9. The supporting structure of claim 1, comprising a second array of pillars formed with the first material and reinforced with the second material, wherein each of the pillars in the first array includes a top and wherein the second array is supported on the tops of the first array.

10. The supporting structure of claim 9, wherein the tops in the second array are smaller in size than the tops in the first array and wherein more than one pillar in the second array is supported on one of the tops in the first array.

11. The supporting structure of claim 9, wherein the pillars in the second array are smaller in size than the pillars in the first array.

12. The supporting structure of claim 1, wherein the first material is a liquid-soluble thermoplastic.

13. The supporting structure of claim 1, wherein the second material is a photopolymer.

14. The supporting structure of claim 1, wherein the supporting structure is formed by an inkjet printing process.

15. A method for supporting an overhang in an object being built in an AM process, the method comprising:
   defining a volume under an overhang of the object as a support volume;
   building a first array of pillars in the support volume with a first material, wherein each of the pillars in the first array includes a top, wherein at least a portion of the tops in the first array adjoin and wherein the first material is a support material;
   building reinforcements around the pillars with a second material, wherein the second material forms a pitched helix along a length of at least a portion of the pillars in the first array; and
   building the overhang on the portion of the tops in the first array that adjoin, wherein the building of the first array of pillars and the reinforcements are performed together with the building of the object and during the same AM process.

16. The method of claim 15 comprising:
   building a contact pad between the portion of the tops in the first array that adjoin and the overhang, wherein the building of the contact pad is performed together with the building of first array of pillars, the reinforcements and the object and during the same AM process.

17. The method of claim 15, wherein the second material is model material with which the object is built.

18. The method of claim 15 comprising:
   building a second array of pillars in the support volume with the first material, wherein each of the pillars in the second array includes a top; and
   building reinforcements around the pillars in the second array with the second material;
   wherein the second array of pillars is built on the first array of pillars.

19. The method of claim 18, wherein the tops in the second array are smaller in size than the tops in the first array and wherein more than one pillar in the second array is supported on one of the tops in the first array.

20. The method of claim 18, wherein the pillars in the second array are smaller in size than the pillars in the first array.

21. The method of claim 15, comprising arranging the first array of pillars to define an array of air pockets shaped as spires therebetween.

22. The method of claim 21, wherein the reinforcements are configured to structurally support the air pockets.

23. The method of claim 15, wherein the AM process is inkjet printing.

24. An additive manufacturing (AM) system comprising:
   at least one dispensing head, wherein the at least one dispensing head includes an array of nozzles configured to selectively dispense support material and model material;
   a non-transitory computer readable medium on which a computer program product is stored, wherein the computer program product is configured to:
      receive digital data pertaining to fabrication instructions for fabricating an object by an AM process;
      identify a volume around the object that requires a supporting structure to structurally support at least a portion the object during fabrication;
      generate instructions for filling the volume with the supporting structure as defined in claim 1; and
   a controller configured to control selective dispensing through the array of nozzles based on the fabrication instructions for fabricating the object and the instructions generated for filling the volume with the supporting structure.

25. The AM system of claim 24, comprising a first dispensing head configured to dispense the model material and a second dispensing head configured to dispense the support material.

* * * * *